(12) United States Patent
Papadelias

(10) Patent No.: US 10,986,285 B2
(45) Date of Patent: *Apr. 20, 2021

(54) OCCULTING DEVICE AND METHODS OF USING SAME

(71) Applicant: Zackarias Papadelias, Old Bridge, NJ (US)

(72) Inventor: Zackarias Papadelias, Old Bridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/896,054

(22) Filed: Jun. 8, 2020

(65) Prior Publication Data

US 2021/0051257 A1 Feb. 18, 2021

Related U.S. Application Data

(63) Continuation of application No. 16/543,481, filed on Aug. 16, 2019, now Pat. No. 10,715,741.

(51) Int. Cl.
*H04N 5/238* (2006.01)
*G02F 1/01* (2006.01)
*G02B 23/00* (2006.01)
*H04N 7/18* (2006.01)

(52) U.S. Cl.
CPC ........... *H04N 5/238* (2013.01); *G02F 1/0126* (2013.01); *G02B 23/00* (2013.01)

(58) Field of Classification Search
CPC ....... B23K 26/032; B23K 9/0956; G02B 5/23
See application file for complete search history.

(56) References Cited

U.S. PATENT DOCUMENTS

| | | | |
|---|---|---|---|
| 10,088,613 B1* | 10/2018 | Thompson | G06T 7/0004 |
| 2008/0151197 A1* | 6/2008 | Mochizuki | G09F 19/18 |
| | | | 353/74 |
| 2009/0213208 A1* | 8/2009 | Glatt | G08B 13/19628 |
| | | | 348/36 |
| 2020/0139484 A1* | 5/2020 | Okuma | B23K 26/064 |

FOREIGN PATENT DOCUMENTS

| | | | |
|---|---|---|---|
| CN | 105108277 A | * | 12/2015 |
| CN | 209231679 U | * | 8/2019 |

* cited by examiner

*Primary Examiner* — Peet Dhillon
(74) *Attorney, Agent, or Firm* — Wei & Sleman LLP

(57) ABSTRACT

An occulting device includes a sensor capable of capturing an image, a photochromic film disposed in a field of view of the sensor, and a projector disposed adjacent the photochromic film and capable of darkening portions of the film.

15 Claims, 5 Drawing Sheets

OCCULTING DEVICE AND METHODS OF USING SAME

CROSS-REFERENCE TO RELATED APPLICATIONS

The present application is a continuation of U.S. patent application Ser. No. 16/543,481 filed Aug. 16, 2019, the content of which is hereby incorporated by reference in its entirety as is fully set forth herein.

FIELD OF THE DISCLOSURE

The present disclosure relates to occulting devices. More particularly the present disclosure relates to digital occulting devices in use with, for example, telescopes.

BACKGROUND OF THE DISCLOSURE

In the fields of astrophysics and astronomy, observing and imaging objects in space are important to research and data collection. With large array terrestrial and orbit-based platforms we are now able to see farther into space than ever before. Such platforms allow the user to see, for example, comets, moons, extrasolar planets and other celestial bodies. Amateurs and professionals alike have more tools at their disposable to observe the universe. With these new, more powerful imaging platforms comes an inherent disability. That disability is not being able to view dim objects in the same field of view as bright objects.

Specifically, bright celestial objects like planets and stars will often hide dimmer objects in their glare making them less visible for observation and imaging. In order to overcome this issue and not only discover, but view and image these dim and usually farther away objects, several solutions have been used to occult the brighter object either mechanically or digitally, effectively minimizing the glare.

There are currently two methods of achieving this occultation for both space-based and terrestrial based telescopes. The first method is to take a physical disc or mask, cut it into a desired shape of a target and mechanically place it in the field of view of either the eyepiece or imager. This is a low-tech solution, and there are several drawbacks to this method, most notably is the inability to precisely match the size of the object being occulted. Objects are either over-masked blocking nearby dim targets, or under-masked which negates the entire occultation. And for a space-based platform, this method is costly in weight and is a high risk for failure in the form of breakdown in the harsh environment of space.

Secondly, digitally masking objects of specific wavelength has been tried. A nulling effect is created by digitally blinding the imaging sensor to a specific wavelength of light (the wavelength of the bright object) and thus essentially occulting the object. As before, this method also has specific limitations. For observing, this method does not work, as the human eye cannot be blinded in the same manner as an imaging sensor thus rendering this method completely ineffective. Also, assuming the bright object and dim object are of different wavelengths this method may be helpful, but when these objects are of the same wavelength nulling would essentially erase them both from the sensor. Thus, the method may hide objects that should be visible.

Thus, it would be helpful to have another occulting method that is not purely mechanical or digital as outlined above, and that would provide proper occulting with great accuracy at a reduced cost.

SUMMARY OF THE DISCLOSURE

In some embodiments, an occulting device includes a sensor capable of capturing an image, a photochromic film disposed in a field of view of the sensor, and a projector disposed adjacent the photochromic film and capable of darkening portions of the film.

In some embodiments, a method of occulting an object includes capturing at least one image via a sensor, placing a photochromic film in a field of view of the sensor, and darkening a portion of the photochromic film via a projector disposed adjacent the photochromic film.

In some embodiments, an occulting device includes a sensor capable of capturing an image, and a clear display disposed in a field of view of the sensor, the display being in communication with the sensor and configured to receive a selection of the image, and display the image in inverted monochrome in front of the sensor.

BRIEF DESCRIPTION OF THE DISCLOSURE

Various embodiments of the presently disclosed occulting devices are described herein with reference to the drawings, wherein.

Figure 1:
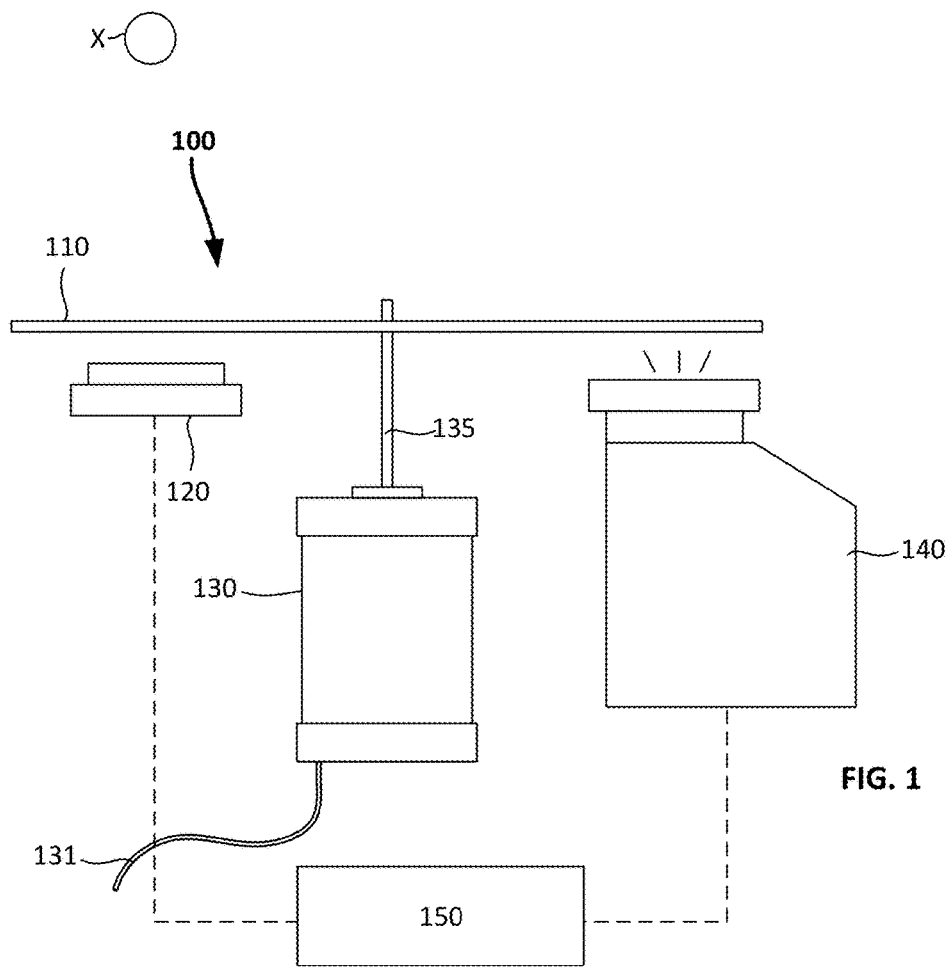
FIG. 1 is a schematic top view showing one embodiment of an occulting device.
Figure 3A:
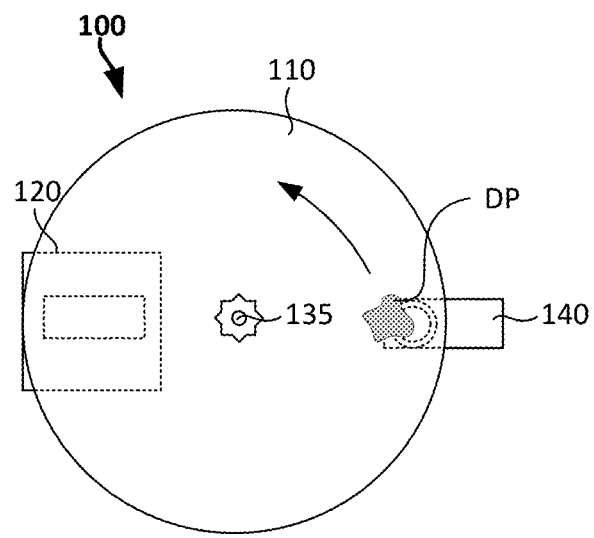
Figure 3B:
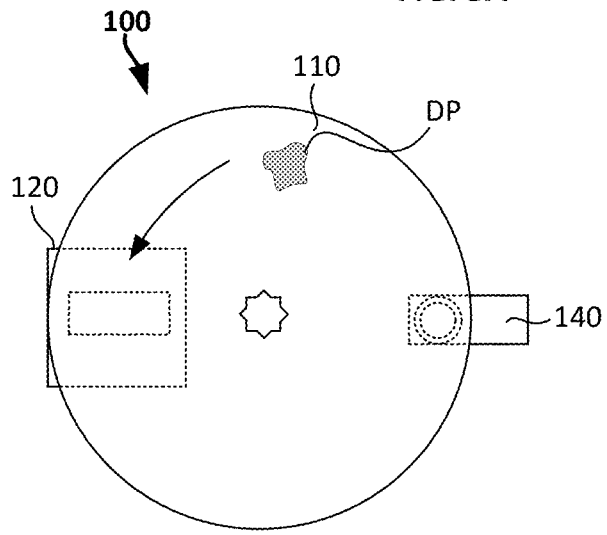
Figure 3C:
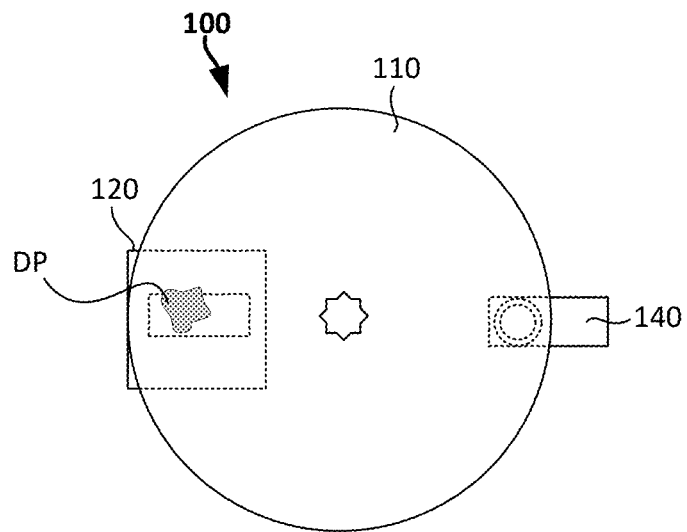
Figure 4:
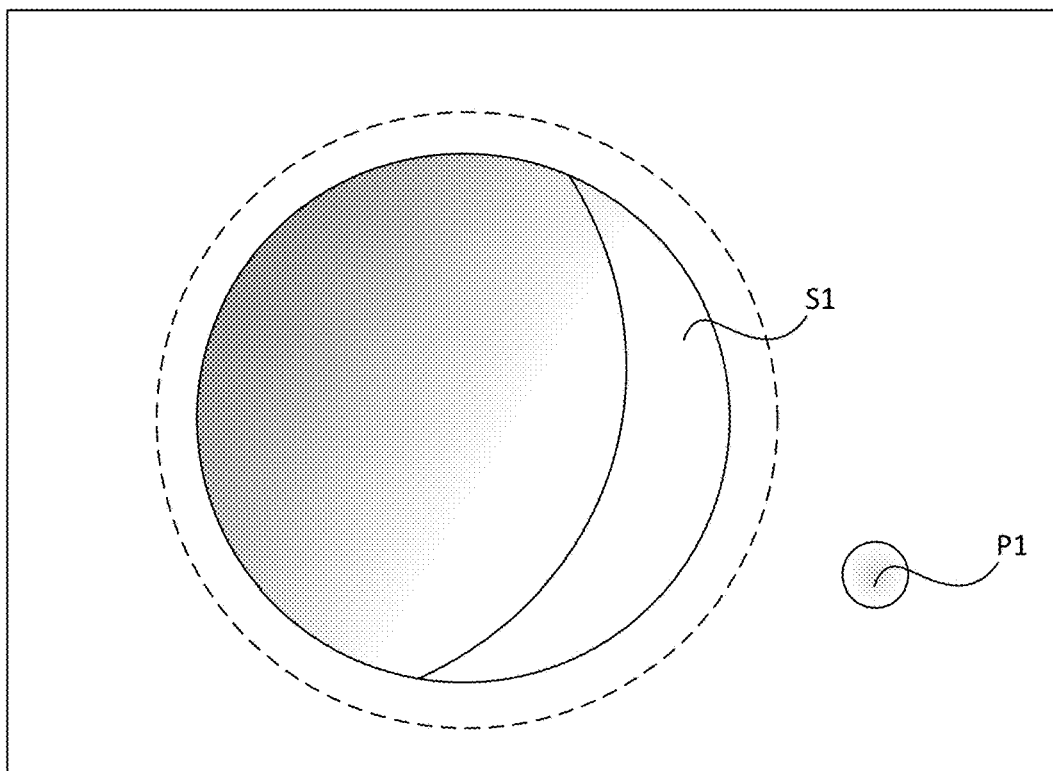
Figure 5:
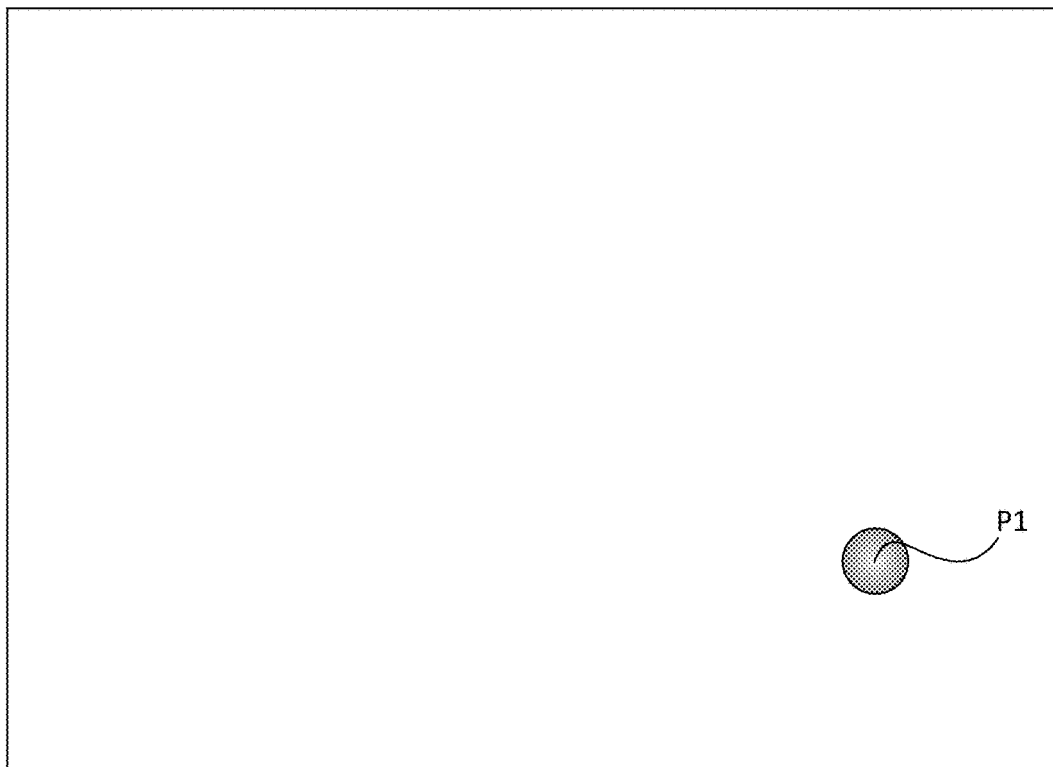
Figure 6:
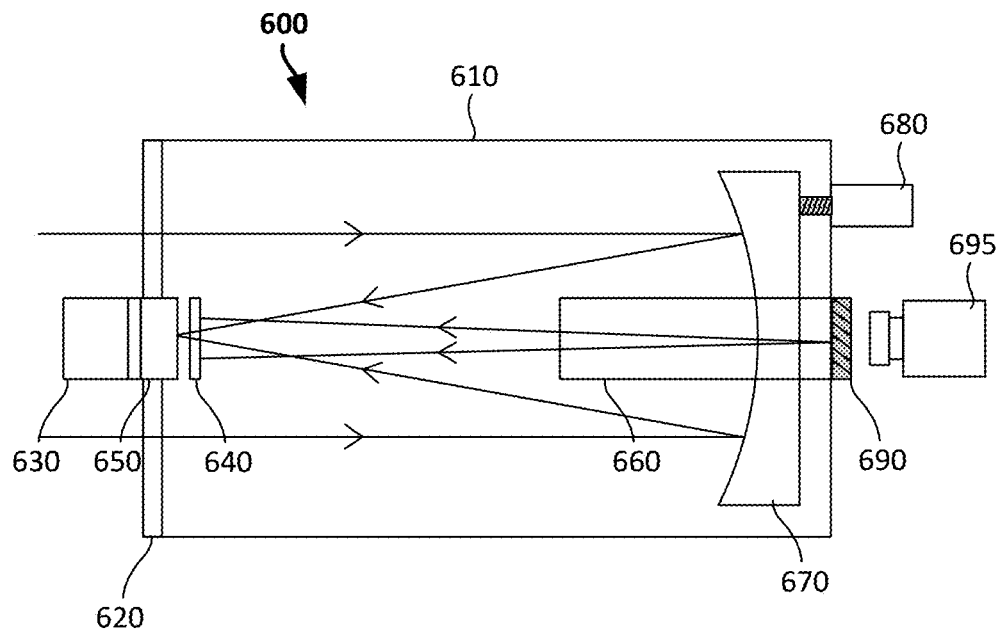
Figure 7:
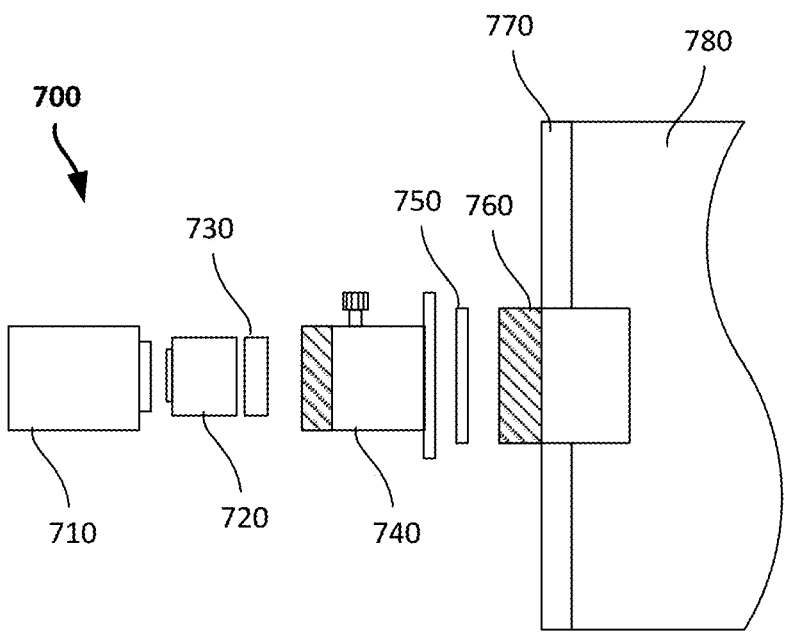
Figure 8:
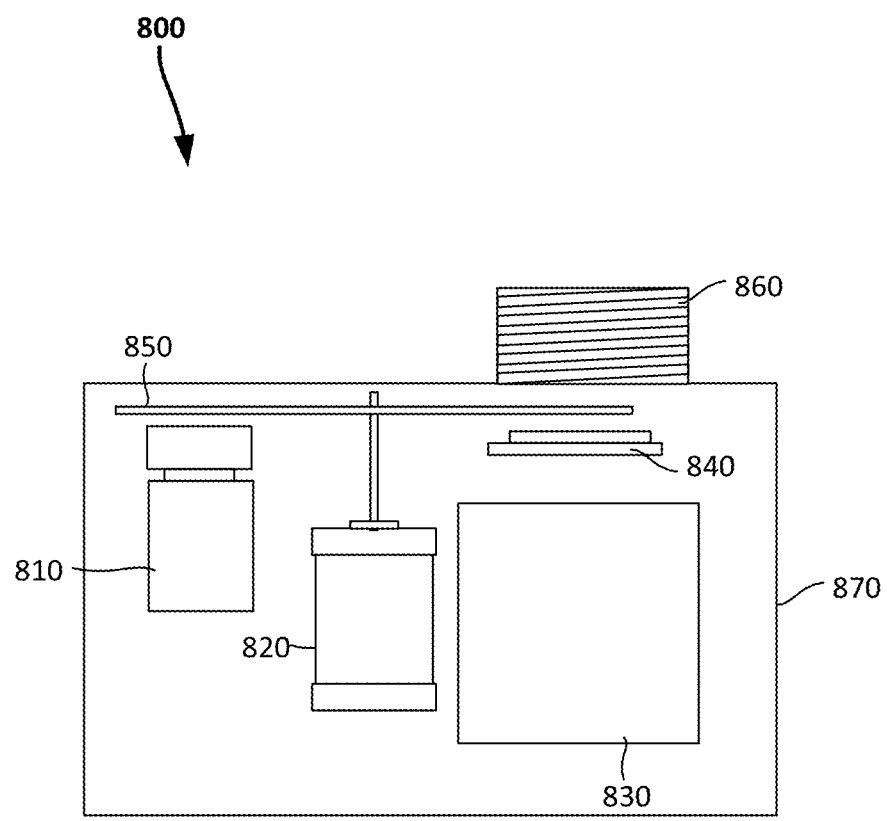

FIG. 3A-C are schematic front views of the occulting device of FIG. 1 after a mask with a darkened portion has been created as it moves from the projector to the sensor; and FIGS. 4 and 5 are schematics showing two fields of view before and after the occulting of an object;

FIGS. 6 and 7 are schematic drawings showing an occulting device being integrated with a telescope; and FIG. 8 shows a stand-alone occulting device that may be coupled to an existing telescope.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to occulting device, conventional devices suffer from some shortcomings as described above.

There therefore is a need for further improvements to the devices, systems, and methods of occulting objects, for example, in the field of astronomy and astrophysics. Among other advantages, the present disclosure may address one or more of these needs.

As used herein, the term "proximal," when used in connection with a component of an occulting device, refers to the end of the component closest to the user, whereas the term "distal," when used in connection with a component of an occulting device, refers to the end of the component farthest from the user of the device. As used herein, the terms "film" is used to describe any structure capable of, or having a coating capable of, darkening as described. In at least some examples, the film may be a flexible element. In at least some other examples, the film may be a rigid element, such as a lens, or portion of glass.

FIG. 1 illustrates on embodiment of an occulting device 100. Although the components of occulting device 100 are illustrated and described as being configured and arranged in one way according to this first embodiment, it will be understood that various modifications and layouts are possible. Occulting device 100 generally includes a photochromic film 110 coupled to a motor 130 (e.g., a dc motor) via a shaft 135. The film 110 is disposed in front of a sensor 120 and a projector 140 (e.g., a DLP projector). Photochromic film 110 may be a film that is sensitive to UV wavelengths and that can be triggered to be darkened in certain regions that are exposed to a light at a selected wavelength. Photochromic lenses or films are optical elements that darken on exposure to specific types of light of sufficient intensity, most commonly ultraviolet (UV) radiation. In the absence of activating light the lenses or films return to their clear state. Photochromic lenses may be made of glass, polycarbonate, or another plastic. They are principally used in eyeglasses that are dark in bright sunlight, but clear in low ambient light conditions. They darken significantly within about a minute of exposure to bright light, and take somewhat longer to clear. A range of clear and dark transmittances is available. Organic photochromic molecules, when exposed to ultraviolet (UV) rays as in direct sunlight, undergo a chemical process that causes them to change shape and absorb a significant percentage of the visible light, i.e., they darken. These processes are reversible; once the lens is removed from strong sources of UV rays the photochromic compounds return to their transparent state.

Figure 2:
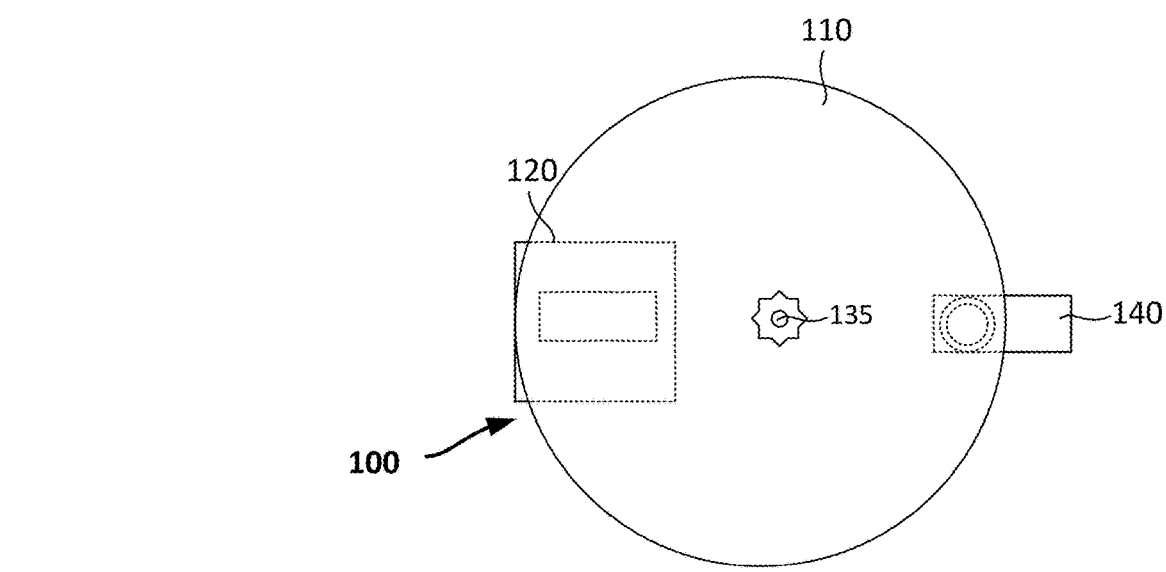
FIG. 2 is a schematic front view of the occulting device of FIG. 1.

In certain examples, as shown in FIG. 2, film 110 may be in the form of a circle that is coupled to a motor via a shaft, the motor being capable of spinning the film about the shaft 135. Motor 130 may be electrically-powered via a wire 131 or may be battery-powered. Sensor 120 may be in the form of a charge-coupled device (CCD) OR CMOS sensor used in digital imaging, and may include a camera and a chip, the sensor 120 being capable of gathering one or more images or real-time video feed through the film. The sensor 120 may be physically or wirelessly in communication with a computer or laptop 150, which in turn is in communication with a projector 140. In at least some examples, projector 140 is a UV-dedicated pico projector. In some examples, any type of DLP projector may be used, though pico projectors allow for a compact design. Further, any type of digital projector may be used, such as those capable of emitting UV, and capable of being fed digital images via a computer. Occulting device 100 may be used to provide real-time occulting of microscopic-sized objects while simultaneously collecting data and images.

In use, the occulting device may be employed in the following manner. First, the device, and specifically sensor 120, may be aimed at a distant object "X" (e.g., a planet in the solar system) to be imaged. Once aimed and focused on object "X", the imaging sensor 120 may capture and send a live feed video stream through the film to computer 150. From this stream, a single frame or short stack of multiple frames may be captured and recorded in monochrome. Monochrome projection in UV would project colored objects as light and black as unlit. Each of the frames of the capture may be modified for brightness and/or contrast, if desired. Using the computer, specific objects within a frame may be selected or the entire frame can then be sent to the pico projector. For example, a user may wish to project the entire frame when there are too many objects to select them individually and/or when the user wishes to block out everything visible to see into very distant regions. The projector 140 may be modified to only project UV light at a predetermined wavelength. In some examples, the projector may be modified to only project UV light at a wavelength of about 405 nm. In at least some examples, the UV light being projected may be in the range in which photochromic film works (e.g., in the UV-A range of 300 to 450 nm). In at least some examples, the wavelength is about 405 nm because it is safer for eyes and doesn't damage the DLP projector's DMD chips. which is suitable for darkening portions of the film 110. Projector 140 may project the selection of the image or the entire frame onto the photochromic film at the predetermined wavelength. Once the light is projected on the film, the photochromic film is designed to react to the UV light and will form a darkened portion "DP" in the otherwise clear film anywhere it is exposed thus creating a mask of the target objects that were selected by the computer and projected by the projector 140 (FIG. 3A). The darkened portion of the film is moved via rotation (FIG. 3B) until it is in front of the sensor 120, the photochromic film being positioned in the imaging sensor field of view (FIG. 3C), and as the film darkens, the bright objects are effectively occulted, further imaging being capable of exposing the dimmer targets within the field. The video feed resumes throughout the process while simultaneously projecting and images and data are then recorded all within the same computer. Additional objects may be selected for occulting. Moreover, the film will return to its clear state after a certain amount of time. Typically, the film is darkened within 30 seconds of exposure and takes several minutes to fade back to clear. Such darkening/clearing ratios may be customized in the film manufacture and are variable so that objects that were improperly occulted will once again be visible in the field of view if the projector ceases projecting light at the selection. In some examples, the projected image may be inverted, or the projector itself may be inverted so that rotation of the image in place brings the image to the proper arrangement (i.e. makes the image right-side up). In some examples, the timing of projector in relation to the rotation of the motor may result in multiple (e.g., four) total images darkened on the film. This is so a freshly exposed image will rotate in front of the sensor every few seconds. In some examples, the projector light source may be linked to the motor so that the project shuts off as the film is rotated as to not create a continuous "trail" of darkened lines on the film.

FIGS. 4 and 5 are schematics showing two screens. In a first screen, planet P1 is not fully visible due to the presence of star S1 in the field of view (FIG. 4). After occulting with the present device, planet P1 is better seen and star S1 is effectively hidden (FIG. 5). Multiples bodies or objects may be occulted, either successively or simultaneously.

Variations of this device are possible. For example, multiple configurations and the arrangements of the components are possible to accommodate various telescope designs. Additionally, the occulting device 100 may be formed as a stand-alone device with the addition of a lens in front of the imaging sensor, or may be integrated into a telescope. Moreover, the device 100 may be small enough for amateur use, or may be scaled up to accommodate the largest telescopes. In some variations, the photochromic film/projector combination may be replaced by a clear glass LCD screen, and the LCD screen may project the captured image in inverted monochrome making the objects to be occulted black and background clear, thus also effectively occulting bright objects when positioned in the sensor field of view.

FIG. 6 illustrates one example of an occulting device with a Schmidt Cassegrain telescope. As shown, a Schmidt Cassegrain Telescope (SCT) tube 610 includes a corrector lens 620. On one end of the tube 610, a sensor such as a CCD imager 630 is disposed in line with a photochromic film 640 and a secondary mirror mount 650. On the other end of the tube 610 is a baffle tube 660 and primary mirror 670. A focuser knob 680 is also included as well as a DLP projector 695 and a threaded rear port 690. In this example, light may enter the camera through the corrector lens 620 and is reflected to the CCD imager 630 passing through the photochromic film 640. The image may be focused by moving the primary mirror 670 up and down the baffle 660. The image may be processed and then projected through the baffle via the DLP projector 695 and focused on the film 640, darkening the areas projected with UV and effectively occulting the processed objects.

Another example of the occulting device is shown in FIG. 7, where a CCD imager 710 is coupled to a c-mount to 1.25" nosepiece 720. A UV/IR cut filter 730 is disposed between the nosepiece 720 and a SCT adapter 740. A photochromic film 750 is provided and disposed in front of a Fastar SCT secondary mount 660. A SCT corrector lens 770 and a telescope tube 780 are also shown.

FIG. 8 illustrates an occulting device that can be added to an existing telescope. The device 800 includes a housing 870 having an adapter 860 (e.g., a 42 mm threaded T-adapter). Inside the housing 870 is a DLP projector 810, a motor 820 coupled to a photochromic film 850, a projector control board 830 and a CCD imager 840. The device 800 may function in the ways described above with respect to the previous embodiments, and may be screwed onto an existing telescope only when needed.

In use, the occulting device 100 may effectively combine the mechanical and digital methods currently in use, while eliminating the shortcomings of each method. Objects may be specifically selected for occulting with exact precision, eliminating the oversize or undersize issues with mechanical occulting. Only objects selected will be projected and thus occulted, allowing for any other undetected objects to shine through. Unlike the nulling method, which will block all objects at the selected wavelength, this design does not block any object not selected. Additionally, an already-occulted image may be captured at any point allowing dimmer and dimmer objects to be occulted resulting in the ability to see farther and farther away. The only limits would be the resolving power of the telescope platform.

Although the invention herein has been described with reference to particular embodiments, is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. An occulting device comprising:
   a sensor capable of capturing at least one image;
   a computer in communication with the sensor and configured and arranged to receive a captured image from the sensor and select a portion of the image as a target;
   an optical element disposed in a field of view of the sensor; and
   a projector disposed adjacent the optical element and configured and arranged to darken first portions of the optical element that correspond to the target and to not darken second portions of the optical element;
   wherein at least one of the optical element and a light source of the projector is configured to move with respect to another of the optical element and the light source of the projector.

2. The occulting device of claim 1, wherein first portions of the optical element may be darkened when exposed to UV light of a wavelength of about 405 nm.

3. The occulting device of claim 1, wherein the projector is a DLP projector.

4. The occulting device of claim 1, wherein the projector is configured to project light at a specific wavelength that will darken the optical element.

5. The occulting device of claim 1, wherein the projector is disposed on a same side of the optical element as the sensor.

6. The occulting device of claim 1, wherein the sensor includes a charge-coupled device.

7. The occulting device of claim 1, wherein the computer is in communication with the projector.

8. An occulting device, comprising:
   a sensor capable of capturing at least one image;
   a computer in communication with the sensor and configured and arranged to receive a captured image from the sensor and select a portion of the image as a target;
   an optical element disposed in a field of view of the sensor;
   a projector disposed adjacent the optical element and configured and arranged to darken first portions of the optical element that correspond to the target and to not darken second portions of the optical element; and
   a motor and a shaft coupled to the motor, the shaft being coupled to the optical element and configured and arranged to move the optical element.

9. A method of occulting an object comprising:
   capturing at least one image via a sensor;
   sending the captured at least one image from the sensor to a computer in communication with the sensor;
   selecting a target from the at least one image;
   placing an optical element in a field of view of the sensor; and
   darkening a first portion of the optical element that corresponds to the target while leaving other portions of the optical element clear via a projector having a light source disposed adjacent the optical element;
   providing a motor and a shaft coupled to the motor, the shaft being coupled to the optical element; and
   moving the optical element via the motor.

10. The method of claim 9, wherein darkening a first portion of the optical element comprises projecting UV light of about 405 nm onto the optical element.

11. The method of claim 9, wherein darkening a first portion of the optical element comprises using a DLP projector to darken a first portion of the optical element.

12. The method of claim 9, further comprising a step of placing the projector on a same side of the optical element as the sensor.

13. The method of claim 9, wherein capturing at least one image comprise using a charge-coupled device to capture the at least one image.

14. The method of claim 9, wherein moving the optical element via the motor comprises rotating the optical element about the shaft.

15. The method of claim 9, further comprising a step of creating a target by selecting a portion of the captured image via the computer and sending the target to the projector.

* * * * *